United States Patent [19]

Rustad

[11] Patent Number: 5,595,824
[45] Date of Patent: Jan. 21, 1997

[54] MAGNETIC RECORDING MEDIA INCORPORATING A POLYISOCYANATE CROSSLINKING AGENT SYSTEM COMPRISING TWO DIFUNCTIONAL AND ONE TRIFUNCTIONAL DIISOCYANATE ADDUCTS

[75] Inventor: Norman E. Rustad, Shoreview, Minn.

[73] Assignee: Imation Corp., St. Paul, Minn.

[21] Appl. No.: 504,463

[22] Filed: Jul. 20, 1995

Related U.S. Application Data

[63] Continuation of Ser. No. 85,189, Jun. 30, 1993, abandoned.

[51] Int. Cl.$^6$ .................................................. G11B 5/702
[52] U.S. Cl. ........................ 428/425.9; 428/694 BU; 428/694 BY; 428/694 BB; 428/900
[58] Field of Search .................... 428/425.9, 694 BU, 428/694 BY, 694 BB, 900

[56] References Cited

U.S. PATENT DOCUMENTS

| | | | |
|---|---|---|---|
| 3,916,039 | 10/1975 | Akashi et al. | 427/128 |
| 4,135,031 | 1/1979 | Akashi et al. | 428/323 |
| 4,368,238 | 1/1983 | Somezawa et al. | 428/413 |
| 4,400,498 | 8/1983 | Konishi et al. | 528/60 |
| 4,474,843 | 10/1984 | Miyoshi et al. | 428/212 |
| 4,525,424 | 6/1985 | Bradshaw | 428/425.9 |
| 4,555,443 | 11/1985 | Kikugawa et al. | 428/336 |
| 4,582,757 | 4/1986 | Miyoshi et al. | 428/329 |
| 4,598,014 | 7/1986 | Miyoshi et al. | 428/323 |
| 4,618,535 | 10/1986 | Nishimatsu et al. | 428/325 |
| 4,686,139 | 8/1987 | Ryoke et al. | 428/323 |
| 4,728,569 | 3/1988 | Ryoke et al. | 428/323 |
| 4,888,212 | 12/1989 | Iida et al. | 427/130 |
| 4,966,797 | 10/1990 | Ishihara et al. | 427/64 |
| 5,039,554 | 8/1991 | Ishikuro et al. | 427/131 |
| 5,069,963 | 12/1991 | Yanai et al. | 428/323 |
| 5,084,336 | 1/1992 | Kenpo et al. | 428/323 |
| 5,134,027 | 7/1992 | Yanagita et al. | 428/323 |
| 5,159,053 | 10/1992 | Kolycheck et al. | 528/76 |
| 5,371,166 | 12/1994 | Farkas et al. | 528/71 |

FOREIGN PATENT DOCUMENTS

| | | |
|---|---|---|
| 0251651 | 1/1988 | European Pat. Off. . |
| 0322826 | 7/1989 | European Pat. Off. . |

*Primary Examiner*—Stevan A. Resan
*Attorney, Agent, or Firm*—Susan Moeller Zerull

[57] ABSTRACT

A magnetic recording medium, comprising a magnetic coating provided on a nonmagnetizable substrate, wherein the magnetic coating comprises a magnetic pigment dispersed in a polymeric binder, said binder being a matrix of cured components which comprise a film-forming, unhindered, aromatic polyisocyanate crosslinking agent and a polymer component.

41 Claims, No Drawings

MAGNETIC RECORDING MEDIA INCORPORATING A POLYISOCYANATE CROSSLINKING AGENT SYSTEM COMPRISING TWO DIFUNCTIONAL AND ONE TRIFUNCTIONAL DIISOCYANATE ADDUCTS

This is a continuation of application Ser. No. 08/085,189 filed Jun. 30, 1993 now abandoned.

FIELD OF THE INVENTION

The present invention relates to magnetic recording media, and more particularly to magnetic recording media in which the magnetic layer or backside coating, if any, of the media incorporates a polyisocyanate crosslinking agent. The present invention also relates to the polyisocyanate crosslinking agent itself.

BACKGROUND OF THE INVENTION

Magnetic recording media generally comprise a magnetic coating provided on at least one side of a nonmagnetizable substrate. For particulate magnetic recording media, the magnetic coating comprises a magnetic pigment dispersed in a polymeric binder. The magnetic coating may also include other components such as lubricants; abrasives; thermal stabilizers; antioxidants; dispersants; wetting agents; antistatic agents; fungicides; bacteriocides; surfactants; coating aids; nonmagnetic pigments; and the like.

Some forms of magnetic recording media, such as flexible magnetic recording tape, also have a backside coating applied to the other side of the nonmagnetizable substrate in order to improve the durability, conductivity, and tracking characteristics of the media. The backside coating typically comprises a polymeric binder, but may also include other components such as lubricants; abrasives; thermal stabilizers; antioxidants; dispersants; wetting agents; antistatic agents; fungicides; bacteriocides; surfactants; coating aids; nonmagnetic pigments; and the like.

The magnetic coating and the backside coating, if any, of a majority of conventional magnetic recording media are derived from materials which require curing in order to provide magnetic recording media with appropriate physical and mechanical properties. To prepare such magnetic recording media, the uncured components of the magnetic coating or the backside coating, as appropriate, are dissolved in a suitable solvent and milled to provide a homogeneous dispersion. The resulting dispersion is then coated onto the nonmagnetizable substrate, after which the coating is dried, calendered if desired, and then cured.

Curing can be achieved in a variety of ways. According to one approach, the polymeric binder of the magnetic coating or the backside coating is derived from hydroxyl functional polymers which rely upon a chemical reaction between the hydroxyl functionality and an isocyanate crosslinking agent to achieve curing. The isocyanate crosslinking agent is typically added to the dispersion just prior to the time that the dispersion is coated onto the substrate.

One factor affecting the performance of magnetic recording media is the reactivity of the crosslinking agent. If the cure rate for a crosslinking agent is too slow, or if its level of cure is too low, then a coating incorporating the agent will tend to have poor green strength until the cure reaction has progressed sufficiently. As a result, the coating will be susceptible to damage, e.g., slit edge damage, during subsequent processing unless an inconvenient and expensive time delay is incorporated into the manufacturing process. Thus, to get a coating with good green strength, a faster reacting crosslinking agent is desirable.

Yet, the crosslinking agent must not react too fast. Once the crosslinking agent is added to a dispersion, the viscosity of the dispersion begins to gradually increase as crosslinking reactions take place. If these crosslinking reactions occur too quickly, the viscosity of the dispersion could increase so rapidly that it then would become extremely difficult to filter and coat the dispersion onto a nonmagnetizable substrate.

One commercially available crosslinking agent that has been used in magnetic recording media is commercially available under the tradename DESMODUR CB-601 from Miles, Inc. This product is an admixture of adducts formed by end-capping a blend of trimethylolpropane and 1,3-butane diol with toluenediisocyanate ("TDI"), an aromatic, sterically hindered diisocyanate. This admixture is relatively slow to react. Coatings prepared from this material tend to have a slow cure profile, poor green strength, and are susceptible to slit edge damage when substrates bearing such coatings are slit into appropriate widths to form magnetic recording tape.

Another commercially available crosslinking agent that has been used in magnetic recording media is available under the tradename PAPI from Dow Chemical Co. The PAPI material is an admixture of about 50% methylene bis(4-phenyl isocyanate) ("MDI") and about 50% of a blend of polymethylene polyphenyl isocyanates. This material reacts relatively quickly, but tends to yield a nonfilm-forming polyurea upon reacting with moisture. Inasmuch as moisture is a prominent reactant in the cure reactions of magnetic and backside coatings, we believe that the non-film-forming nature of such materials tends to reduce the resilience, toughness, and the like of coatings incorporating such materials.

SUMMARY OF THE INVENTION

The present invention provides film-forming, unhindered, aromatic polyisocyanate crosslinking agents which provide magnetic and backside coatings with better green strength, better cure profiles, and improved slit edge quality as compared to coatings prepared from aromatic crosslinking agents that are hindered. The crosslinking agents of the present invention also provide more resilient, less brittle coatings than coatings prepared from crosslinking agents that lack film-forming capabilities.

In particularly preferred embodiments, the crosslinking agent of the present invention comprises (a) a diisocyanate of the formula

(b) a first diisocyanate adduct of the formula

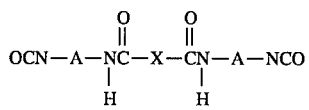

and (c) a second diisocyanate adduct of the formula

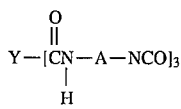

wherein:
each A moiety is independently a divalent, organic linking group having a chemical structure such that each NCO group pendant from each A moiety is aromatic and unhindered;

X is a divalent, organic linking group;

Y is a trivalent, organic linking group;

the crosslinking agent comprises less than about 25 weight percent of the diisocyanate; and the weight ratio of the first diisocyanate adduct to the second diisocyanate adduct is in the range from about 1:20 to 20:1.

Although the polyisocyanate crosslinking agents of the present invention may be advantageously used in any application requiring a crosslinking agent with reactive NCO groups, the polyisocyanate crosslinking agents of the present invention are particularly suitable for use in magnetic recording media. One embodiment of a magnetic recording medium of the present invention comprises a nonmagnetizable substrate having first and second opposed major surfaces. A magnetic coating is provided on one major surface of the nonmagnetizable substrate. The magnetic coating comprises a magnetic pigment dispersed in a polymeric binder, wherein the polymeric binder is a matrix of cured ingredients which comprise the film-forming, unhindered, aromatic polyisocyanate crosslinking agent and a polymer component. The polymer component of the magnetic layer preferably comprises a polymer with pendant hydroxyl groups.

Another embodiment of a magnetic recording medium of the present invention comprises a nonmagnetizable substrate having first and second opposed major surfaces. A magnetic coating is provided on one side of the nonmagnetizable substrate, and a backside coating is provided on the second major surface of the substrate. The backside coating comprises a polymeric binder, wherein the polymeric binder is a matrix of cured ingredients which comprise the film-forming, unhindered, aromatic polyisocyanate crosslinking agent and a polymer component. The polymer component of the backside coating preferably comprises a polymer with pendant hydroxyl groups.

Another embodiment of a magnetic recording medium of the present invention comprises a nonmagnetizable substrate having first and second opposed major surfaces. A magnetic coating is provided on one side of the nonmagnetizable substrate, and a backside coating is provided on the second major surface of the substrate. The magnetic coating comprises a magnetic pigment dispersed in a polymeric binder, wherein the polymeric binder is a matrix of cured ingredients which comprise the film-forming, unhindered, aromatic polyisocyanate crosslinking agent and a polymer component. The backside coating comprises a polymeric binder, wherein the polymeric binder is a matrix of cured ingredients which comprise the film-forming, unhindered, aromatic polyisocyanate crosslinking agent and a polymer component. Preferably, each polymer component of the magnetic coating and the backside coating independently comprises a polymer with pendant hydroxyl groups.

The term "film-forming" means that, upon reaction with moisture, the crosslinking agent is capable of being applied to a solid substrate to form a continuous, dry film. Preferred film-forming materials of the present invention are resilient. Resilient means that a substantially flat sample of a film-forming material can be flexed to about 45°, more preferably to about 90°, without cracking and is then capable of substantially returning to its original flat configuration after the flexing force has been removed.

The term "unhindered" means that there are no ring substituents in an ortho position relative to the aromatic NCO groups of the crosslinking agent.

The term "aromatic" with respect to an NCO group means that the NCO group is attached to i.e., it is a ring substituent of, an aromatic moiety.

The term "polyisocyanate" means that the crosslinking agent comprises one or more polyfunctional isocyanates having an average functionality of at least 2 isocyanate groups per molecule.

DESCRIPTION OF THE PREFERRED EMBODIMENTS

The film-forming, unhindered, aromatic polyisocyanate crosslinking agent of the present invention preferably is an admixture of one or more aromatic, unhindered polyisocyanate compounds having an average NCO equivalent weight of less than about 500, and preferably an average NCO equivalent weight in the range from about 150 to about 500. If the NCO equivalent weight is too low, the resulting crosslinking agent may not be film-forming. On the other hand, if the NCO equivalent weight is too high, adding the crosslinking agent to a coating may reduce the pigment volume concentration of any pigments contained in such coatings to undesirably low levels. For purposes of the present invention, the average NCO equivalent weight of the crosslinking agent is based on % solids of a solution of the crosslinking agent and is determined according to a two-step process. In the first step, the solution is analyzed according to ASTM D2572 to obtain the percent NCO of the crosslinking in the solution. In the second step, the percent NCO obtained from ASTM D2572 is used to calculate the NCO equivalent weight according to the following formula:

$$EW_{NCO} = \frac{42 \times S}{P_{NCO}}$$

wherein:
$EW_{NCO}$ is the average NCO equivalent weight of the crosslinking agent;

S is the weight percent of solids of the crosslinking agent in the solution to be subjected to the ASTM procedure; and $P_{NCO}$ is the percent NCO obtained from ASTM D2572.

The crosslinking agents of the present invention can be prepared and/or used in solvent or neat, but are most advantageously used in a solvent. Example of suitable solvents for preparing or using the crosslinking agents include tetrahydrofuran ("THF"), methyl ethyl ketone ("MEK"), propyleneglycol methyl ether acetate ("PMA"), and the like.

In one embodiment of the present invention, the crosslinking agent comprises a diisocyanate adduct of the formula

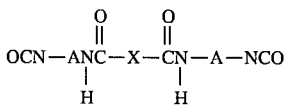

wherein:
each A moiety is independently a divalent, organic linking group having a chemical structure such that each NCO group pendant from each A moiety is aromatic and unhindered; and X is a divalent organic linking group.

In another embodiment of the invention, the crosslinking agent comprises a diisocyanate adduct of the formula

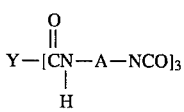

wherein:
each A moiety is as defined above; and
Y is a trivalent organic linking group.

In the practice of the present invention, examples of moieties suitable for use as the A moiety include

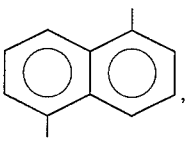

and

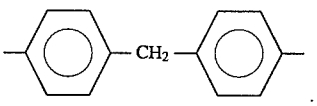

Preferably, the moiety X has the formula

wherein $R^1$ is a divalent, organic linking group. Examples of moieties suitable for use as $R^1$ include straight, branched or cyclic alkylene, arylene, aralkylene, polyalkylene oxide, polyalkylene sulfide and polyester moieties. Mixtures of such moieties may also be used. Preferably, $R^1$ is selected from

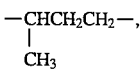

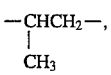

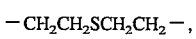

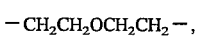

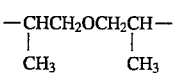

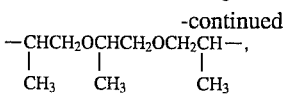

and mixtures thereof.

Preferably, the moiety Y has the formula

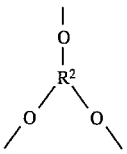

wherein $R^2$ is a trivalent, organic linking group. More preferably, $R^2$ is selected from

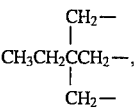

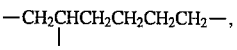

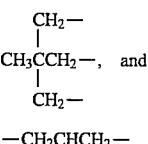

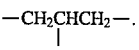

One particularly preferred class of crosslinking agents of the present invention (hereinafter the "Preferred Crosslinking Agent") comprises a diisocyanate of the formula

OCN—A—NCO, a first diisocyanate adduct of the formula

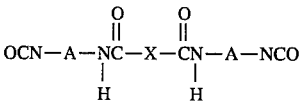

and a second diisocyanate adduct of the formula

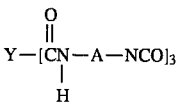

wherein A, X, and Y are as defined above. The Preferred Crosslinking Agent desirably contains less than about 25 weight percent, preferably less than about 15 weight percent, and more preferably less than about 10 weight percent, of the diisocyanate. If too much of the diisocyanate is present, then the resultant crosslinking agent may not be film-forming. Since moisture is an important reactant in the curing reactions of magnetic and backside matings, we believe that the ability of the polyisocyanate crosslinking agent to form films improves the mechanical properties, e.g., resilience, durability, and the like, of such coatings. For the Preferred Crosslinking Agent, the weight ratio of the first diisocyanate adduct to the second diisocyanate adduct is in the range from about 1:20 to 20:1, preferably 1:5 to 5:1.

The Preferred Crosslinking Agent can be prepared in a variety of ways. According to one strategy, the Preferred Crosslinking Agent may be prepared according to a two-step reaction scheme. In the first step, an aromatic, unhindered diisocyanate, or combination of such diisocyanates, is reacted with one or more diols such that the molar ratio of NCO groups from the diisocyanate to OH groups from the diol(s) is greater than 3:1 and preferably is in the range from about 3:1 to about 4:1. The reaction product of this first step is an admixture containing unreacted diisocyanate and an adduct which is the diol end-capped with the diisocyanate. This first reaction step can be represented by the following exemplary reaction in which 1,3 butane diol is end-capped with paraphenylene diisocyanate ("PPDI"):

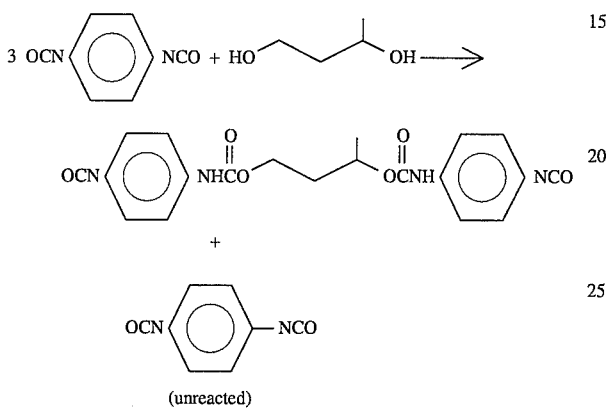

The above reaction is an ideal reaction with no side reactions shown. In practice, though, some side reactions may occur, e.g., coupling reactions instead of capping reactions. As a substitute for carrying out this first reaction step, admixtures containing diol/diisocyanate adducts and unreacted diisocyanate may be purchased commercially from a manufacturer who, in effect, has already carried out the first reaction step. One specific example of such a material is a prepolymer commercially available under the tradename ISONATE 2181 from Dow Chemical Co. The ISONATE 2181 prepolymer is an admixture of about 50 weight percent MDI, about 25% of an adduct of dipropylene glycol end-capped with MDI, and about 25% of an adduct of tripropylene glycol end-capped with MDI. The ISONATE 2181 prepolymer is not film-forming.

In a second reaction step, the product prepared or purchased in the first step is reacted with one or more triols in an amount such that the molar ratio of NCO groups from the unreacted diisocyanate to OH groups of the triol is preferably about 2: 1. The objective of this second step is to end-cap the triol with the diisocyanate while minimizing the amount of unreacted diisocyanate remaining after this second step. The second reaction step may be represented by the following exemplary reaction in which trimethylolpropane is reacted with the reaction product from the first reaction step, and the trimethylol propane is thereby end-capped with the unreacted PPDI:

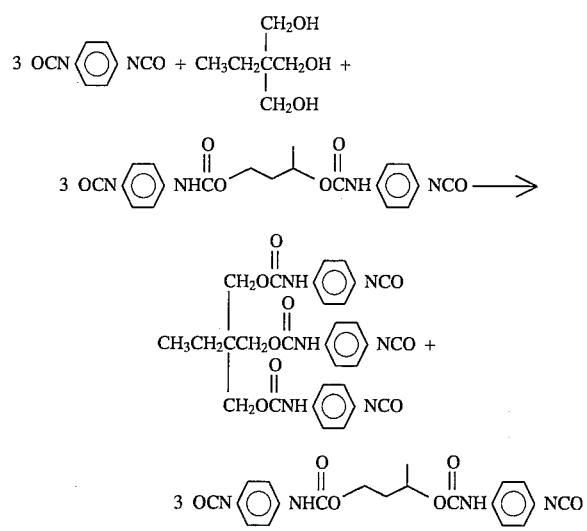

The above reaction is an ideal reaction with no side reactions shown. In practice, though, some side reactions may occur, e.g., coupling reactions instead of capping reactions.

According to another strategy, the Preferred Crosslinking Agent may be prepared according to a different two-step reaction scheme in which the aromatic, unhindered diisocyanate, or combination of such diisocyanates, is first reacted with a triol and then a diol. According to the first step of this scheme, the diisocyanate is reacted with one or more triols in an amount such that the molar ratio of the NCO groups from the diisocyanate to the OH groups of the triol is preferably about 5: 1. The reaction product of this first step is an admixture comprising unreacted diisocyanate and an adduct which is the triol end-capped with the diisocyanate. In a second step this admixture is reacted with one or more diols in an amount such that the molar ratio of NCO groups from the unreacted diisocyanate to the OH groups from the diol is preferably about 2:1.

According to another strategy, the Preferred Crosslinking Agent may be prepared according to a one-step reaction scheme in which the aromatic, unhindered diisocyanate, or combination of such diisocyanates, is reacted with a blend of one or more triols and one or more diols. According to this scheme, the molar ratio of NCO groups from the diisocyanate to the total moles of OH groups from both the triol and diol preferably is about 2:1.

Examples of aromatic, unhindered diisocyanates suitable for preparing the Preferred Crosslinking Agent include methylene bis(4-phenylisocyanate) ("MDI"), paraphenylene diisocyanate ("PPDI"), and 1,5-naphthalenediisocyanate ("NDI"). The use of MDI is most preferred. These isocyanates have the following structures and physical properties:

| Ingredient | Structure | Melting Point (°C.) | Boiling Point (10 mm Hg, °C.) | Vapor Pressure (mm Hg, 20° C.) |
|---|---|---|---|---|
| MDI | (4,4'-methylenediphenyl diisocyanate) | 38 | 208 | <0.00001 |
| PPDI | (p-phenylene diisocyanate) | 94 | 110 | <0.006 |
| NDI | (1,5-naphthalene diisocyanate) | 127 | 183 | <0.0001 |

A variety of diols and triols may be used to prepare the Preferred Crosslinking Agent. Examples of diols suitable for use in the practice of the present invention include 1,3-butane diol, diethyleneglycol, 1,2-propyleneglycol, thiol diglycol, diethylene glycol, and mixtures thereof. Examples of triols suitable for use in the practice of the present invention include glycerol, trimethylolpropane, trimethanol ethane, 1,2,6-hexane triol, and mixtures thereof. The weight ratio of the triol to diol used to prepare the Preferred Crosslinking Agent is desirably in the range from about 1:20 to 20:1, preferably 1:5 to 5:1, and more preferably is about 1:1.

A particularly preferred embodiment of the Preferred Crosslinking Agent is an admixture comprising the following components:

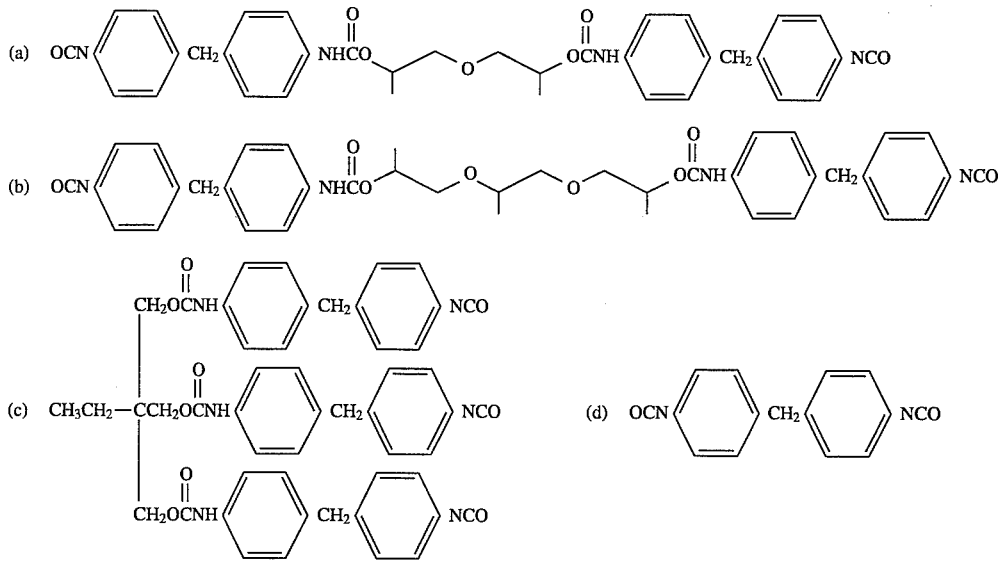

Preferably, the admixture contains about 25 weight percent of component (a), about 25 weight percent of component (b), about 40 weight percent of component (c), and about 10 weight percent of component (d).

The polyisocyanate crosslinking agent of the present invention advantageously may be incorporated into the magnetic and/or backside coatings of magnetic recording media. These coatings are provided on the major surfaces of a nonmagnetizable substrate having first and second opposed major surfaces. The nonmagnetizable substrate of the present invention may be formed from any suitable substrate material known in the art. Examples of suitable substrate materials include, for example, polymers such as polyethylene terephthalate ("PET"), polyimide, and polyethylene naphthalate ("PEN"); ceramics; glass; metals such as aluminum, or copper; paper; or any other suitable material.

Magnetic coatings of the present invention typically comprise a magnetic pigment dispersed in a polymeric binder. Typically, the magnetic layer may contain 100 parts by weight of the magnetic pigment and 5 to 40 parts by weight of the polymeric binder. The type of magnetic pigment used in the present invention may include any suitable magnetic pigment known in the art including $\gamma$-$Fe_2O_3$, cobalt-doped $\gamma$-$Fe_2O_3$, $Fe_3O_4$, $CrO_2$, barium ferrite, barium ferrite derivatives, metal particles, and the like. In addition to the polymeric binder and the magnetic pigment, the magnetic coating of the present invention may also comprise one or more conventional additives such as lubricants; abrasives; thermal stabilizers; antioxidants; dispersants; wetting agents; antistatic agents; fungicides; bacteriocides; surfactants; coating aids; nonmagnetic pigments; and the like in accordance with practices known in the art.

Backside coatings of the present invention typically comprise a polymeric binder and, optionally, one or more conventional additives such as lubricants; abrasives; thermal stabilizers; antioxidants; dispersants; wetting agents; antistatic agents; fungicides; bacteriocides; surfactants; coating aids; nonmagnetic pigments; and the like in accordance with practices known in the art.

Polymeric binders suitable for preparing the magnetic coating and/or the backside coating may include any polymer component conventionally used in the magnetic recording art. Because the crosslinking agents of the present invention are film-forming, it is not necessary for the polymer component to have OH functionality. However, preferably, the polymer component comprises at least one polymer with pendant hydroxyl, i.e., OH, groups. The OH groups not only allow the polymer to crosslink with the polyisocyanate crosslinking agent but also promote dispersion of the inorganic pigments in the binder, promote the solubility of the polymer in solvents, and promote the compatibility of the polymer with other polymers. The OH groups can be primary, secondary, or tertiary, although the use of primary and/or secondary OH groups is preferred. Generally, preferred hydroxyl functional polymers have an OH equivalent weight in the range from 200 to 20,000, preferably 300 to 5000. Optionally, the polymer component may also comprise at least one polymer having no pendant OH groups.

One or more of the polymer or polymers, if more than one polymer is used, of the polymer component may contain one or more other kinds of pendant functional groups to enhance the performance of the magnetic recording medium. For example, any polymer of the polymer component may contain carbon-carbon double bonds if it is desired to crosslink the binder using both isocyanate and radiation curing techniques. See, for example, assignee's copending application U.S. Ser. No. 07/893,912, filed Jun. 4, 1992, bearing Attorney's Docket No. 46797USA3A. As other examples of pendant functional groups, any polymer of the polymer component may contain a pendant dispersing group in order to facilitate dispersion of magnetic or nonmagnetic pigments in the polymeric binder. The term "dispersing group" means that a group is capable of wetting the magnetic or nonmagnetic pigments to facilitate dispersion of such pigments in the polymeric binder. Preferably, the dispersing group is a moiety that is ionized or ionizable at a pH in the range from 2 to 10. Representative examples of suitable dispersing groups include quaternary ammonium moieties (e.g., —$N(CH_3)_3^+$ $Cl^-$ as one example), amines (e.g., —$N(CH_3)_2$ as one example), heterocyclic moieties as described in U.S. Pat. No. 5,081,213, sulfobetaines (e.g., —$N^+(CH_3)_2(CH_2CH_2CH_2SO_3^-)$), salts or acids based on sulfate (e.g., —$OSO_3Na$ as one example), salts or acids based on sulfonate (e.g., —$SO_3Na$ as one example), salts or acids based on phosphate (e.g., —$OPO(OH)_2$ as one example), salts or acids based on phosphonate (e.g., —$PO(OH)_2$ as one example), salts or acids based on carboxyl (e.g., —$COONa$ as one example), mixtures thereof, and the like.

The polyisocyanate crosslinking agent of the present invention is preferably incorporated into magnetic coatings or backside coatings in an amount such that the equivalent ratio of NCO groups from the crosslinking agent to the hydroxyl groups from the hydroxyl functional polymer, or polymers, is greater than 0. Preferably, the equivalent ratio of the NCO groups from the crosslinking agent to the hydroxyl groups from the hydroxyl functional polymer, or polymers, is in the range from 0.3 to 3.0, more preferably 0.8 to 1.8.

As soon as the polyisocyanate crosslinking agent of the present invention is blended with the hydroxyl functional polymer(s) of the polymer component, the NCO groups of the crosslinking agent will begin to react with the hydroxyl groups of the hydroxyl functional polymer(s). Optionally, a catalyst, e.g., dibutyltin dilaurate or a tertiary amine, may also be added in suitable catalytic amounts in order to facilitate this crosslinking reaction. However, we have found that the NCO groups of the polyisocyanate crosslinking agents of the present invention react sufficiently fast so that catalysts are not required to cure the coatings.

In one preferred magnetic recording medium of the present invention, the polymer component of the magnetic layer comprises a first hydroxyl-functional polymer having a glass transition temperature, Tg, of less than about 25° C. and a second hydroxyl-functional polymer having a Tg of greater than about 50° C. For purposes of the present invention, Tg is determined using differential scanning calorimetry techniques. In a particularly preferred magnetic coating of the present invention, the first hydroxyl-functional polymer is a polyurethane and the second hydroxyl-functional polymer is a vinyl copolymer. In addition to hydroxyl groups, it is also preferred that each of the polyurethane and the vinyl copolymer also has a pendant dispersing group. Specific examples of such polymeric binders are described in assignee's copending application U.S. Ser. No. 08/054,312, filed Apr. 27, 1993, bearing Attorney's Docket No. 49417USA4A. Other preferred examples of such polymeric binders have been described in U.S. Pat. No. 5,069,807.

The magnetic coating can be coated onto a nonmagnetizable substrate in a variety of ways. As one example of a process for applying the magnetic coating onto a nonmagnetizable substrate, the components of the magnetic coating are combined and mixed with a suitable solvent to form a substantially homogeneous dispersion, except that the polyisocyanate crosslinking agent is combined and mixed with the other components of the magnetic dispersion just prior to coating. The dispersion is then coated onto the nonmagnetizable substrate, which may be primed or unprimed. The dispersion may be applied to the substrate using any conventional coating technique, such as gravure or knife coating techniques. The coated substrate may then be passed through a magnetic field to orient the magnetic pigment after which the coating is dried, calendered if desired, and then allowed to cure.

In magnetic recording media of the type having a backside coating, a particularly preferred backside coating (hereinafter the "Preferred Backside Coating") comprises nitrocellulose, polyurethane, two kinds of carbon black, an inorganic nonmagnetic pigment, and the film-forming, unhindered, aromatic polyisocyanate crosslinking agent of the present invention. The Preferred Backside Coating is characterized by low friction. Furthermore, using the Preferred Backside Coating in magnetic recording media substantially reduces pack shifting associated with lengths of magnetic recording tape wound on a reel. Pack shifting is a problem that results when layers of magnetic recording tape wound on a reel shift and, in severe instances, unspool.

The nitrocellulose polymer imparts low friction and good durability characteristics to the backside coating. The hydroxyl functionality of nitrocellulose also helps disperse the carbon black. A preferred class of nitrocellulose polymers has a number average molecular weight in the range from 10,000 to 50,000. A specific example of one nitrocellulose polymer that has been found to be suitable in the practice of the present invention is commercially available under the tradename RS ½ second from Aqualon Co. This nitrocellulose has a Tg of over 150° C. and is sold as 70% solids in $H_2O$ or isopropyl alcohol.

A wide variety of polyurethanes may be used in the Preferred Backside Coating. A preferred class of polyurethanes are the polyurethanes which have a Tg of less than 25° C. A specific example of one polyurethane found to be particularly suitable in the practice of the present invention is commercially available as ESTANE 5703 P from B. F. Goodrich Co. This polyurethane has a Tg of –30° C. and has excellent crosslinking characteristics. Preferably, the weight ratio of polyurethane to nitrocellulose in the Preferred Backside Coating is in the range from about 1:10 to about 10:1, preferably from about 3:7 to about 7.3.

The two different kinds of carbon black particles included in the Preferred Backside Coating include relatively small-sized carbon black and relatively large-sized carbon black. The small-sized carbon black provides opacity and increases the conductivity of the coating, and preferably has an average size in the range from about 20 to about 80 nm, preferably from about 40 to about 60 nm. The large-sized carbon black imparts durability and low friction to the backside coating, and preferably has an average size in the range from about 200 to about 400 nm, preferably from about 250 to 300 nm. Preferably, the Preferred Backside Coating contains from about 35 to about 45 weight percent of carbon black. Preferably, 5 to 30, preferably 20, weight percent of the carbon black is the large-sized carbon black. A specific example of a small-sized carbon black found to be suitable in the practice of the present invention is a 42 nm carbon black commercially available as 100% compressed acetylene carbon black from Chevron Chemical Co. A specific example of a large-sized carbon black found to be suitable in the practice of the present invention is a 270 nm carbon black commercially available as Thermax N-991 from Cancarb, Ltd.

Optionally a wetting agent, or combination of such agents, may be added to the Preferred Backside Coating to help disperse the carbon black throughout the coating. A variety of wetting agents would be suitable for use in the practice of the present invention. Examples of wetting agents suitable for dispersing the carbon black include Emcol Phosphate, Emcol Acetate, phosphorylated polyoxyalkyl polyols, polymers bearing dispersing groups, and the like. Lecithin is most preferred. Adding lecithin to the coating not only helps wet the carbon black, but also reduces the viscosity of the dispersion. We have found that using 2 to 4 parts by weight, preferably 4 parts by weight, of lecithin based upon 100 parts by weight of carbon black is suitable in the practice of the present invention.

The inorganic nonmagnetic pigment of the Preferred Backside Coating preferably has a Mohs hardness of greater than 4, more preferably greater than 7. The Preferred Backside Coating preferably contains 5 to 20, more preferably 10 to 15, weight percent of the inorganic nonmagnetic pigment. Examples of inorganic nonmagnetic pigments suitable in the practice of the present invention include $TiO_2$, $CaCO_3$, $Al_2O_3$, $\alpha$-$Fe_2O_3$, $SiO_2$, $ZnO$, $BaSO_6$, and the like. Alumina is most preferred. Alumina having an average size of about 0.5 microns has been found to be particularly suitable in the practice of the present invention.

U.S. Pat. No. 5,069,963 states that inorganic particles having a Mohs hardness of less than 7 must be used in a backside coating to avoid burnishing tape guides that guide a magnetic recording tape. This suggests that the use of alumina in a backside coating should be avoided, inasmuch as alumina has a Mohs hardness of 9. We have found, however, that, when alumina is used, calendering the Preferred Backside Coating provides a backside coating which does not cause excessive tape guide wear notwithstanding the presence of as much as 10–15 weight percent alumina. Even more significantly, the friction of a calendered Preferred Backside Coating of the present invention containing as much as 10 to 15 weight percent of alumina in combination with the nitrocellulose does not increase over time, even when cycled under high temperature and high humidity conditions. Calendering also improves the durability of the backside in that calendered backsides of the present invention generate less debris than uncalendered coatings.

Magnetic recording media containing the Preferred Backside Coating can be prepared in a variety of ways. According to one procedure, the nitrocellulose is dried. Then, the dried nitrocellulose, the polyurethane and the wetting agent, if any, are combined and mixed at 6 to 10 percent solids in a solvent blend of 71.5 parts by weight tetrahydrofuran ("THF"), 20.0 parts by weight methyl ethyl ketone, and 8.6 parts by weight toluene. The carbon black is then slowly added to the mixture with high speed mixing using a SHAR mixer and mixed an additional one hour after all the carbon black has been added. The mixture is then milled using ceramic media until smooth. Predispersed, premilled alumina is added to the milled dispersion with high speed mixing using the SHAR mixer.

The alumina may be predispersed and premilled by milling and then filtering the alumina at 75% solids in THF using 1 part by weight EMCOL Phosphate and 1 part by weight of a phosphorylated polyoxyalkyl polyol based on 100 parts by weight of the alumina. EMCOL Phosphate and the phosphorylated polyoxyalkyl polyol ("PPP") have been described in U.S. Pat. No. 5,028,483 at col. 5.

After adding the predispersed and premilled alumina to the dispersion, the dispersion is thinned down with THF to a desired solids content for coating, typically about 14% solids. Fungicide and/or lubricants, if desired, may also be added to the dispersion at the same time. After filtering, the dispersion may be coated onto a substrate, or it may be stored for up to about one year for coating at a later date. Just prior to coating the dispersion onto a substrate, the polyisocyanate crosslinking agent of the present invention is added and the dispersion is then filtered again. The filtered dispersion is then coated onto one side of the substrate, after which the coated substrate is dried in an oven. The magnetic coating is then applied to the other side of the substrate, after which the coated substrate is dried again. Next, both the magnetic coating and the backside coating are calendered. The resulting magnetic recording medium can be slit to an appropriate width and then loaded onto a cartridge or cassette reel or the like.

The present invention will now be further described with reference to the following examples. In the following examples, the nitrocellulose was dried before use.

EXAMPLE 1

To prepare a crosslinking agent of the present invention, a 227 liter stainless steel reactor was maintained under a vacuum so as to draw reactants into the reactor. Under this vacuum, 84.1 kg of propylene glycol methylether acetate ("PMA") was drawn into the reactor with agitation at 75 rpm. 118.8 kg of ISONATE 2181 MDI prepolymer (containing 652 NCO equivalents) was added to the reactor with agitation, followed by 2.3 kg of PMA to act as a line flush. After the ISONATE 2181 MDI prepolymer was dissolved, the vacuum was broken with nitrogen gas, and a flow of nitrogen was set up at a slow rate across the surface of the solution to prevent moisture from entering the reaction. 10.8 kg of trimethylolpropane (TMP) (240 OH equivalents) was added to the solution in the reactor. After adding the TMP, the temperature of the solution was maintained at about 80° C. with agitation for 2 hours. The reaction product was a clear liquid having a viscosity of 1230 cps with 58.6% solids, and an average NCO equivalent weight of 321.

EXAMPLE 2

To prepare a crosslinking agent of the present invention, 375 g of PMA dried over molecular sieve was placed in a 1000 ml 3-necked round bottom flask. 450 g of ISONATE 2181 MDI prepolymer was added to this flask with stirring and was dissolved. To this solution was added 40.5 g TMP with stirring and the mixture was heated to 80° C. with a heating mantle and maintained for 2 hours.

The resulting reaction product was a clear, viscous liquid at 57% solids, 13% free diisocyanate, and an average NCO equivalent weight of 328. "Free diisocyanate" as used in these examples means the weight percent of unreacted diisocyanate remaining in the crosslinking agent.

The crosslinking agent was incorporated into a magnetic dispersion prepared from the following formulation:

| Magnetic dispersion ingredient | Parts by weight based on dried coating |
| --- | --- |
| Co-γ-Fe$_2$O$_3$ Magnetic Pigment | 100 |
| Al$_2$O$_3$ (HPF Alumina, available from Reynolds Metal Co.) | 7 |
| Phosphorylated Polyoxyalkyl Polyol described in U.S. Pat. No. 5,028,483, col. 5* | 2.07 |
| EMCOL Phosphate (See U.S. Pat. No. 5,028,483 at col. 5) | 0.07 |
| Sulfonated Hydroxy-functional Polyurethane | 9.2 |
| prepared according to Example 3 in U.S. Pat. No. 5,071,578 | |
| MR120 Vinyl Chloride Copolymer (Nippon Zeon, Inc.) | 9.2 |
| Myristic Acid | 2 |
| Butyl Stearate | 1 |
| Crosslinking Agent | 7.2 |

*This compound shall be referred to hereinafter as "PPP".

The Al$_2$O$_3$ was predispersed and premilled in tetrahydrofuran (THF) at approximately 75% solids with 0.07 parts each of the PPP and the EMCOL Phosphate. The magnetic pigment, remaining PPP, sulfonated hydroxy-functional polyurethane and vinyl chloride copolymer were mixed under high shear with THF at about 45% solids and milled in a horizontal sand mill with sufficient residence time to produce a smooth dispersion which was then filtered. A smooth dispersion is defined as being substantially homogeneous and free of agglomerates when visually inspected. The predispersed Al$_2$O$_3$ was then mixed with the dispersion and the resulting mixture was diluted to 32% solids with THF for coating. The myristic acid, butyl stearate and crosslinking agent in solution were added to the mixture just prior to coating and the mixture was filtered.

A backside coating dispersion was prepared using the following formulation:

| Backside dispersion ingredient | Parts by weight |
| --- | --- |
| VULCAN XC-72 Carbon Black (Cabot Corp.) | 36.2 |
| Al$_2$O$_3$ (0.9 μm diameter) | 5.9 |
| TiO$_2$ (0.5 μm diameter) | 9.1 |
| VAGH vinyl copolymer (Union Carbide Corp.) | 4.3 |
| RJ100 styrene allyl alcohol copolymer (Monsanto Co.) | 10.0 |
| Polyurethane polymer (described in U.S. Pat. No. 4,837,082) | 14.3 |
| Lecithin | 2.1 |
| DESMODUR CB601 isocyanate material (Miles, Inc.) | 17.0 |
| ADMA 6 Tertiary Amine Catalyst (Ethyl Corp.) | 0.8 |
| PPP | 0.3 |

The Al$_2$O$_3$ was predispersed and premilled at approximately 70% solids in MEK, toluene, and cyclohexanone (63/22/15) with 0.3 parts of the PPP. The carbon black, TiO$_2$, lecithin, VAGH vinyl copolymer, RJ100 copolymer, and polyurethane polymer were mixed with MEK, toluene, and cyclohexanone (75:10:15) at about 28% solids in a high speed mixer and then milled in a horizontal sand mill until smooth. The resulting mixture was thinned down to 23% solids with a solvent blend of MEK, toluene, and cyclohexanone (75:10:15) and filtered. Prior to coating, the predispersed Al$_2$O$_3$ and DESMODUR CB-601 material were blended into the dispersion and the mixture was filtered.

The magnetic dispersion was applied to a 7 micron (0.28 mil), biaxially-oriented polyethylene terephthalate (PET) film using a rotogravure coating apparatus. The coated film was magnetically oriented, passed through an oven set at 80° C. to drive off volatile materials, and immediately calendered at 214 kg/cm and 54° C. to provide a very smooth magnetic recording surface. The coated film was wound into a roll and placed in a curing oven at 50° C. and 15% relative humidity for two hours. The backside coating was then applied to the surface of the film opposite the magnetic coating in a second trip through the coating apparatus.

After two hours of curing at 50° C. and 15% R. H., the level of cure of the magnetic coating was measured. To perform this analysis, a 155 cm$^2$ sample of coated film was placed in a vial with 20 cc of THF for sufficient time to remove the coating. The extraction solution was decanted from the vial and subjected to gas permeation chromatography (GPC) analysis. The quantity of extracted material per unit volume of THF appearing in the GPC output indicated the level of cure. The magnetic coating was 85% cured.

COMPARATIVE EXAMPLE A

A magnetic coating was prepared according to the formulation and method described in Example 2, except that, in the magnetic coating, DESMODUR CB-601 (Miles, Inc.) material was substituted for the crosslinking agent of Example 2. The DESMODUR CB-601 material is an admixture of an adduct of toluene diisocyanate (TDI) with 1,3-butanediol and an adduct of TDI with TMP. The resulting magnetic coating was tested identically to the magnetic coating described in Example 2. After two hours of curing, the magnetic coating was only 25% cured.

EXAMPLE 3

To prepare a crosslinking agent of the present invention, 20 g of propylene glycol methylene acetate ("PMA") was dried over a molecular sieve and placed into an 11 dram glass vial. 20 g of ISONATE 143-L carbodiimide modified liquid MDI (also available as ISONATE 2143-L) from Dow Chemical Co. (0.1389 NCO eq.) was added to the vial and dissolved by shaking the closed vial. 1.6 g of trimethylolpropane (TMP) (0.0356 OH eq.) was added to the vial and the solution was heated over the steam bath for 30 minutes. 1.6 g of 1,3 butanediol (0.0356 OH eq.) was then added to the vial, and the solution was further heated for 30 min. The reaction product was a clear, viscous liquid at 53.7% solids and 375 average NCO equivalent.

EXAMPLE 4

A crosslinking agent was prepared in the same manner as Example 3, except that pure MDI was substituted for ISONATE 143-L modified MDI, and the following amounts of ingredients were used:

| Ingredient | Amount |
| --- | --- |
| PMA | 20 g |
| Pure MDI (flake form) | 20 g (0.16 NCO eq.) |
| TMP | 1.8 g (0.04 OH eq.) |
| 1,3 butanediol | 1.8 g (0.04 OH eq.) |

The reaction product was a clear, viscous liquid at 54% solids and 294 average NCO equivalent weight.

EXAMPLE 5

Samples of crosslinking agents were prepared to determine the effect of free diisocyanate concentration upon the film-forming ability of the resulting polyisocyanate crosslinking agents. Three samples were made using the following ingredients in the following amounts:

| Ingredients | Sample | | |
| --- | --- | --- | --- |
| | 5A | 5B | 5C |
| PMA | 40 g | 40 g | 40 g |
| ISONATE 2181 | 50 g | 50 g | 50 g |
| TMP | 4.5 g | 2.25 g | 1.125 g |

To prepare each sample, the PMA was dried in a molecular sieve and placed in an 11 dram glass vial. The ISONATE 2181 MDI prepolymer was placed in the vial and dissolved. The TMP was added to the vial and the solution was heated over a steam bath for about 2 hours, maintaining the solution temperature at about 80° C. Films were cast of each of the samples by coating 5 g of the reaction product on a glass plate and allowing the coating to cure at 21° C. and 50% R. H. for 3 days, followed by curing for 24 hours in an oven at 60° C.

Each cast film was evaluated for appearance and flexibility. The film-forming characteristics of each sample were tested to see if the cured, east film had sufficient flexural strength to be removed from the glass in substantially one piece and remain substantially whole when flexed by hand. Each sample was also analyzed for free diisocyanate using gas permeation chromatography (GPC). The results are shown below:

| Sample | % Free diisocyanate | Film-forming ability |
| --- | --- | --- |
| 5A | 16–18 | yes - no cracking. Film was flexible and resilient. |
| 5B | 25–28 | borderline - somewhat brittle film |
| 5C | 35–39 | no - film cracked when flexed |

These results show that increases in the free diisocyanate concentration in the crosslinking agent corresponded to decreases in the film-forming ability. Film-forming ability was lost when the % free diisocyanate reached 35%.

EXAMPLE 6

To prepare a crosslinking agent of the present invention without the use of solvent, 450 g of ISONATE 2181 MDI prepolymer was placed in a 1000 ml round bottom flask. 40.5 g of TMP was added to the flask with agitation. The mixture was heated to 80° C. and maintained at that temperature for 2 hours. The reaction product was a viscous liquid at 80° C., but became solid at room temperature. While still hot the crosslinking agent was divided into aliquot portions and those portions were dissolved in THF or MEK solvents at 60% solids. The THF solution showed an average NCO equivalent weight of 302, while the MEK solution showed an average NCO equivalent weight of 305. Both solutions had 15% free diisocyanate by GPC analysis.

EXAMPLE 7

To prepare a crosslinking agent of the present invention, 200 g of propylene glycol methylether acetate (PMA) was dried over a molecular sieve and placed in a 1000 ml 3-necked round bottom flask. 105 g of paraphenylene diisocyanate (PPDI) (1.31 NCO eq.) was added to the flask with stirring and was dissolved by heating with a mantle to 80°14 90° C. To this solution was added 14.8 g of TMP with further stirring while maintaining the temperature at 80°–90° C. for 15 minutes. An additional 95 g of PPDI (1.19 NCO eq.) was added to the flask and dissolved. Once a solution was obtained, 13.5 g of TMP was added and the mixture was heated for 2 hours at a temperature in the range from 80° C. to 90° C. 1,3-butanediol was then added to the flask in a first portion of 13 g (0.29 OH eq.) and a second portion of 14.9 g (0.33 OH eq.) to avoid a large exotherm and maintain a reaction temperature below 90° C. The solution was then heated for two hours at a temperature in the range from 80° C. to 90° C.

The reaction product was a clear, viscous liquid at 57% solids, 10% free diisocyanate, and average NCO equivalent weight of 215. The crosslinking agent remained as a liquid for a period of several days before crystallizing. The crystallized material was returned to a liquid state with heating.

EXAMPLE 8

To prepare a crosslinking agent of the present invention, 64.1 g trimethylolpropane (1.43 OH eq.) and 64.6 g 1,3 butanediol (1.43 OH eq.) were added to a 2 liter flask along with a solvent blend made of 565 g propylene glycol methylether acetate (PMA) and 115 g tetrahydrofuran (THF). After stirring to dissolve the solids, 321.3 g PPDI (4.0 eq.) was added to the flask and the mixture was heated to 80° C. with stirring and held at that temperature for two hours. The reaction product was a liquid at 4055 solids, average NCO equivalent weight of 382, and 0.43% free diisocyanate.

To measure the amount of free PPDI in the crosslinking agent of this example, the free PPDI was converted to dibutylurea by the following process. 1.3 g dibutylamine (0.1 eq.) was dissolved in a mixture of 12 g tetrahydrofuran and 1.4 g methanol with stirring. 5 g of the crosslinking agent prepared in this example (0.005 eq.) was added to the solution with further stirring. The reaction product was subjected to high pressure liquid chromatographic (HPLC) analysis using an adduct of pure PPDI and dibutylamine in tetrahydrofuran solvent as a calibration standard. The percentage of free PPDI is based upon the weight of solids in the crosslinking agent.

EXAMPLE 9

A magnetic coating and a backside coating were prepared according to the procedure described in Example 2, except the crosslinking agent in the magnetic coating was the crosslinking agent of Example 8.

PET film was coated, cured and tested identically to the processes described in Example 2. After two hours of curing, the finished sample was 76% cured.

EXAMPLE 10

To prepare a crosslinking agent of the present invention, 20 g of propylene glycol methylether acetate (PMA) was dried over a molecular sieve and placed in an 11 dram glass vial. 10 g of PPDI was added to the vial and was dissolved by shaking the closed vial over a steam bath. 1.3 g of 1,3 butanediol was added to the vial and the mixture was heated for 15 minutes over the steam bath. An additional 10 g of PPDI was added to the vial and dissolved. Once a solution was obtained, 1.3 g of 1,3 butanediol was added and the mixture was heated for 30 minutes. Two further 1.3 g charges of 1,3 butanediol were added to the vial, each charge followed by one hour of heating.

The reaction product was a clear, viscous liquid which crystallized upon standing at room temperature.

EXAMPLE 11

To prepare a crosslinking agent of the present invention, 20 g of propylene glycol methylether acetate (PMA) was dried over a molecular sieve and placed in an 11 dram glass vial. 10 g of PPDI was added to the vial and was dissolved by shaking the closed vial over a steam bath. 1.6 g of diethylene glycol (DEC) was added to the vial and the mixture was heated for 15 minutes over the steam bath. An additional 10 g of PPDI was added to the vial and dissolved. 1.6 g of DEC was then added and the mixture was heated for one hour. 1.3 g of 1,3 butanediol was added to the vial followed by 1.5 hours of heating. Finally, an additional 1.3 g of 1,3 butanediol was added followed by one hour of heating.

The reaction product was a clear, viscous liquid which turned to paste upon standing at room temperature. The paste became fluid upon heating.

EXAMPLE 12

To prepare a crosslinking agent of the present invention, 20 g of tetrahydrofuran (THF) was placed in an 11 dram glass vial. 10 g of 1,5 naphthalene diisocyanate (NDI) (0.095 NCO eq.) was added to the vial and dissolved by shaking and heating the closed vial over a steam bath. 1g of trimethylolpropane (TMP) (0.22 OH eq.) was added to the vial and the mixture was heated for two hours. 1g of 1,3 butanediol (0.22 OH eq.) was then added to the vial followed by an additional two hours of heating.

A small amount of insoluble material was removed from the reaction product by centrifuge, leaving a clear viscous liquid.

EXAMPLE 13

The coated films prepared in Examples 2 and 9 and in Comparative Example A were tested to demonstrate the rate of cure of the crosslinking agents of those examples.

Samples were taken from each roll of coated film prior to the 2-hour curing step. Sample pieces were placed in vials which were held in two controlled atmosphere ovens having 50° C./50% R. H. and 50° C./15% R. H. conditions. Vials were removed from both ovens at 0.5, 1.0, 2.0 and 4.0 hour intervals during a 4-hour period for measurement of magnetic coating cure using THF extraction followed by GPC analysis. Results are shown in the table below.

| Example | | Cure time [hours] | | | |
|---|---|---|---|---|---|
| | | 0.5 | 1.0 | 2.0 | 4.0 |
| 2 | cure [%] 50° C./50% RH | 86 | 91 | 92 | 92 |
| 2 | cure [%] 50° C./15% RH | 66 | 82 | 90 | 93 |
| 9 | cure [%] 50° C./50% RH | 87 | 92 | 93 | 94 |
| 9 | cure [%] 50° C./15% RH | 60 | 75 | 84 | 88 |
| Comp A | cure [%] 50° C./50% RH | 3 | 47 | 80 | 84 |
| Comp A | cure [%] 50° C./15% RH | 3 | 10 | 45 | 78 |

At both levels of humidity, the coatings of Examples 2 and 9 containing inventive crosslinking agents had cured to a significantly greater degree after the first 30 minutes than the comparative sample using the conventional crosslinking agent.

EXAMPLE 14

The coated and cured films prepared in Example 2 and 9 and in Comparative Example A were examined for slit edge quality and tested to demonstrate the level of resistance to microfracturing. Microfracturing is defined as cracks or other failure in the cured magnetic coating visible under microscopic examination. To conduct the analysis, a small computer controlled stress-strain material tester (MINIMAT testing apparatus from Polymer Laboratories) was used with an adjacently located inverted ZEISS optical microscope.

6.4 mm wide magnetic tape was slit from each roll. A strip of tape about 50 mm long was mounted under slight tension in the clamps of the material tester with the magnetic coating facing the microscope objective. With the microscope in reflection mode at a magnification of 400 times, the coated tape surface was brought into focus. The slit edge was examined for coating integrity after slitting. The presence of cracks in the slit edge indicates poorer edge quality than a clean edge. The tape was then subjected to a pre-programmed stress-strain experiment under continuous microscopic observation. At the first appearance of microfracturing in the coating, the stress-strain experiment was stopped and the percent strain of the tape was measured. The results were as follows:

| Example | Slit edge quality       | Strain at microfracture [%] |
|---------|-------------------------|-----------------------------|
| 2       | No cracks - clean edge  | 11.4                        |
| 8       | No cracks - clean edge  | 8.5                         |
| Comp A  | Cracked edges           | 8.4                         |

The slit edge quality of the tapes made according to Examples 2 and 9 was better than that of the tape made according to Comparative Example A, while the strain at microfracture was comparable or slightly higher.

EXAMPLE 15

Magnetic coating dispersions were prepared from the following ingredients using the procedure described in Example 2:

| Ingredient | Magnetic dispersion Sample (all amounts are parts by weight based on the dried coating) | | | | |
|---|---|---|---|---|---|
| | 15A | 15B | 15C | 15D | 15X |
| Co-γ-Fe$_2$O$_3$ | 100 | 100 | 100 | 100 | 100 |
| Al$_2$O$_3$ (HPF Alumina from Reynolds Metal Co.) | 7 | 7 | 7 | 7 | 7 |
| phosphorylated polyoxyalkyl polyol (described in U.S. Pat. No. 5,028,483 at col. 5) | 0.07 | 0.07 | 2.07 | 2.07 | 2.07 |
| Emcol phosphate | 0.07 | 0.07 | 0.07 | 0.07 | 0.07 |
| sulfonated polyurethane polymer (prepared in accordance with Example 3 of U.S. Pat. No. 5,021,578) | 12.5 | 12.5 | 9.9 | 9.9 | 9.9 |
| MR-120 Vinyl Chloride Copolymer (Nippon Zeon, Inc.) | 12.5 | 12.5 | — | — | — |
| MR-113 Vinyl Chloride Copolymer (Nippon Zeon, Inc.) | — | — | 9.9 | 9.9 | 9.9 |
| Myristic acid | 2 | 2 | 1.5 | 1.5 | 1.5 |
| Butyl stearate | 1 | 1 | 1 | 1 | 1 |
| Crosslinking agent prepared in accordance with Example 2 | — | 7.4 | — | 7.5 | 11 |
| DESMODUR CB-601 isocyanate material | 7.4 | — | 7.8 | — | — |

Backside coating dispersions were prepared from the following ingredients:

| Ingredient | Backside dispersion Sample (all amounts are parts by weight based on the dried coating) | | | |
|---|---|---|---|---|
| | 15E | 15F | 15G | 15H |
| Small Carbon Black (100% compressed acetylene carbon black, Chevron Chemical Co.) | 100 | 80 | 80 | 80 |
| Large Carbon Black (Thermax N-991, Cancarb, Ltd.) | — | 20 | 20 | 20 |
| Al$_2$O$_3$ (Reynolds Metal) | 9.5 | 33.8 | 33.8 | 33.8 |
| Lecithin | — | 4 | 4 | 4 |
| PPP | 2.6 | 0.34 | 0.34 | 0.34 |
| Emcol Acetate | 3.0 | — | — | — |
| Emcol Phosphate | — | 0.34 | 0.34 | 0.34 |
| Polyurethane polymer (ESTANE 5705, BF Goodrich) | 87.8 | — | — | — |
| Phenoxy resin (PKHU, Union Carbide) | 58.4 | — | — | — |
| Nitrocellulose polymer (RS 1/2 sec., Aqualon) | — | 33.2 | 33.2 | — |
| Nitrocellulose (FM 200S, Daicel Chemical Industries, Ltd.) | — | — | — | 33.2 |
| Polyurethane polymer (ESTANE 5703P, BF Goodrich) | — | 49.8 | 49.8 | 49.8 |
| Fungicide (AMICAL-48, Angus Chemical Co.) | — | — | 0.5 | 0.5 |
| DESMODUR CB-601 isocyanate material | 33.9 | 28.1 | — | 28.1 |
| Crosslinking agent of Example 1 | — | — | 28.1 | — |

To prepare the backside dispersion 15E, the alumina was premilled and predispersed at 50% solids in THF along with about 0.1 parts by weight of the PPP. Meanwhile, the Emcol Acetate, the remaining PPP, the phenoxy resin, the carbon black, the polyurethane polymer, and a solvent blend of 85.4/8.5/6.1 THF, MEK, and toluene were combined and thoroughly mixed under high shear to provide a mixture at about 15% solids. The mixture was then milled with glass media until smooth. The predispersed and premilled Al$_2$O$_3$ was then added under high shear conditions. Just prior to coating, the CB-601 material was added as 60% solids in PMA along with a sufficient amount of THF to thin the mixture to 14% solids. The dispersion was then filtered.

Examples 15F and 15G were prepared according to the procedure of Example 20.

To prepare backside dispersion 15H, the nitrocellulose polymer, polyurethane polymer, lecithin and a solvent blend of tetrahydrofuran (THF), methyl ethyl ketone (MEK), toluene, and cyclohexanone (66.7/24.9/7.5/0.9) were combined and thoroughly mixed in a high shear mixing chamber to give a mixture at about 7–8% solids. The carbon blacks were added to the mixture, and the mixture was then milled in a horizontal sandmill containing SEPR ceramic media for 46 minutes residence time. A 75% solution in THF containing the $Al_2O_3$, and 1 part each PPP and Emcol Phosphate per 100 parts $Al_2O_3$ was added to the milled dispersion with high shear mixing. The fungicide was then added with a sufficient amount of THF and further mixing to bring the dispersion to about 14% solids. Just prior to coating, a 60% solids solution of the crosslinking agent in PMA was added to the dispersion with mixing, and the resulting mixture was filtered.

To prepare magnetic tape samples, a magnetic coating dispersion and a backside dispersion were applied to opposite surfaces of a 7 micron (0.28 mil) biaxially oriented polyethylene terephthalate (PET) film using a single pass rotogravure coating process. The magnetic tapes were tested for cure level in the following manner: Approximately 24 $in^2$ (155 $cm^2$) samples of film having either the magnetic coating only or the backside coating only were cured at 21° C. and 50% R. H. Portions of these samples were removed periodically for GPC analysis of cure level of that coating. Other samples having either the magnetic coating only or the backside coating only were cured at 60° C. for 1 day to give an indication of the long-term cure level for that coating. The results for magnetic coating cure and backside coating cure are shown in the following two tables.

| Sample | Magnetic Coating | Backside Coating | Curing Conditions | Magnetic Coating Cure | | | | | |
|---|---|---|---|---|---|---|---|---|---|
| | | | | % cure, 1 day | % cure, 2 day | % cure, 3 day | % cure, 5 day | % cure, 7 day | % cure, 14 day |
| 15-1 | 15A | 15E | 21° C., 15% RH | 6 | 21 | 32 | — | 58 | — |
| 15-2 | 15B | 15E | 21° C., 15% RH | 48 | 62 | 65 | — | 74 | — |
| 15-3 | 15C | dispersion prepared according to Example 2 | 21° C., 15% RH | 38 | — | — | — | 79 | — |
| 15-4 | 15D | 15G | 21° C., 15% RH | 77 | — | 84 | — | 89 | 89 |
| 15-5 | 15D | 15E | 21° C., 15% RH | 72 | — | 88 | — | 91 | — |
| 15-6 | 15X | 15H | 21° C., 15% RH | 79 | — | — | 90 | — | — |
| 15-1 | 15A | 15E | 60° C. | 92 | — | — | — | — | — |
| 15-2 | 15B | 15E | 60° C. | 91 | — | — | — | — | — |
| 15-3 | 15C | dispersion prepared according to Example 2 | 60° C. | 98 | — | — | — | — | — |
| 15-4 | 15D | 15G | 60° C. | 97 | — | — | — | — | — |
| 15-5 | 15D | 15E | 60° C. | 98 | — | — | — | — | — |
| 15-6 | 15X | 15H | 60° C. | 97 | — | — | — | — | — |

The speed and extend of cure of the magnetic coating at 21° C., particularly within the first day of aging, was much greater for the magnetic tapes coated with the magnetic dispersions having the crosslinking agent of this invention.

| Sample | Backside coating | Curing conditions | Backside coating cure | | | |
|---|---|---|---|---|---|---|
| | | | % cure, 1 day | % cure, 4 day | % cure, 7 day | % cure, 14 day |
| 15-7 | 15H | 21° C., 15% RH | — | — | — | 5 |
| 15-8 | 15F | 21° C., 15% RH | — | — | — | 0 |
| 15-9 | 15G | 21° C., 15% RH | 5 | 64 | 81 | 88 |
| 15-7 | 15H | 60° C. | 68 | — | — | — |
| 15-8 | 15F | 60° C. | 26 | — | — | — |
| 15-9 | 15G | 60° C. | 96 | — | — | — |

The speed and extent of cure both at 21° C. and 60° C. of the backside coating containing the inventive crosslinking agent (15G) was far greater than for backside coatings containing the conventional crosslinking agent (15F, 15H). The conventional backside coatings did not approach full cure (100%) even with 24 hours of 60° C. curing.

EXAMPLE 16

A mixture of about 7–8% solids was prepared from 33.2 parts by weight of nitrocellulose polymer (RS ½ sec, Aqualon Co.), 49.7 parts by weight polyurethane polymer (Estane 5703 P, B. F. Goodrich Co.), 4 parts by weight lecithin (Cetrolux-P, Central Soyu Co.), and a 71.5/20/8.6 solvent blend of tetrahydrofuran ("THF"), methyl ethyl ketone ("MEK"), and toluene. The mixture was thoroughly mixed in a high shear mixing chamber. Next, 80 parts 100% compressed acetylene carbon black (Chevron Chemical Co.) and 20 parts Thermax N-991 carbon black (Cancarb, Ltd.) were added with high shear mixing, increasing the percent solids to 18%. After adding and mixing the carbon black, the mixture was milled for 46 minutes mill residence time in a horizontal sandmill containing SEPR ceramic media. Next, a 75% solids solution in THF containing 33.8 parts by weight predispersed and premilled $Al_2O_3$ (the solution also contained 0.34 parts Emcol phosphate and 0.34 parts of PPP) was added to the milled dispersion with high shear mixing. Next, 0.5 parts by weight fungicide (AMICAL-48, Angus Chemical Co.) was added with high shear mixing along with sufficient THF to thin the dispersion to about 14% solids.

Just prior to coating, a 60% solids solution in PMA containing 28.2 parts by weight of a polyisocyanate crosslinking agent (prepared in accordance with Example 1) was added to the dispersion with high shear mixing. The dispersion was then filtered, gravure coated onto a PET film substrate, and dried. A magnetic coating (prepared in accordance with Sample 15C of Example 15) was coated onto the other side of the substrate. Both coatings were then calendered. The resultant magnetic recording tape was then slit into an appropriate width and loaded into a cartridge or a cassette.

EXAMPLE 17

A magnetic recording tape was prepared in accordance with Example 16, except (1) the mill residence time was reduced to 40 minutes; (2) the additional fungicide and the additional THF were added along with the polyisocyanate crosslinking agent at the time of coating; and (3) a magnetic coating prepared in accordance with Sample 15A was used instead of the Sample 15C coating.

EXAMPLE 18

Backside coating dispersions were prepared from the following ingredients:

| Sample | Ingredients/Parts by weight* | | | | | | | |
|---|---|---|---|---|---|---|---|---|
| | Small carbon black (100% compressed acetylene carbon black) | Large carbon black (Thermax N-991) | Lecithin | $Al_2O_3$ | Nitrocellulose (RS 1/2 sec) | Polyurethane (Estane 5703 P) | Crosslinking agent (prepared in accordance with Example 1) | Fungicide |
| 18A | 80 | 20 | 4 | 33.8 | 28.2 | 52.3 | 30.3 | 0.5 |
| 18B | 80 | 20 | 4 | 25.0 | 32.1 | 46.1 | 41.6 | 0.5 |
| 18C | 80 | 20 | 4 | 42.5 | 27.0 | 38.9 | 35.8 | 0.5 |
| 18D | 80 | 20 | 4 | 42.5 | 21.0 | 51.4 | 29.4 | 0.5 |
| 18E | 80 | 20 | 4 | 25.0 | 37.1 | 53.3 | 29.4 | 0.5 |
| 18F | 80 | 20 | 4 | 25.0 | 28.0 | 68.5 | 23.3 | 0.5 |
| 18G | 80 | 20 | 4 | 33.8 | 28.2 | 52.3 | 30.3 | 0.5 |
| 18H | 80 | 20 | 4 | 25.0 | 24.9 | 61.0 | 33.9 | 0.5 |
| 18I | 80 | 20 | 4 | 42.5 | 23.7 | 57.9 | 20.2 | 0.5 |
| 18J | 80 | 20 | 4 | 42.5 | 31.3 | 45.1 | 25.3 | 0.5 |
| 18K | 80 | 20 | 4 | 33.8 | 28.2 | 52.3 | 30.3 | 0.5 |
| 18L | 80 | 20 | 4 | 18.6 | 32.3 | 59.9 | 34.1 | 0.5 |
| 18M | 80 | 20 | 4 | 48.9 | 24.0 | 44.6 | 26.5 | 0.5 |
| 18N | 80 | 20 | 4 | 33.8 | 21.3 | 65.2 | 24.3 | 0.5 |
| 18O | 80 | 20 | 4 | 33.8 | 34.1 | 41.1 | 35.5 | 0.5 |
| 18P | 80 | 20 | 4 | 7.5 | 35.3 | 65.5 | 36.9 | 0.5 |
| 18Q | 80 | 20 | 4 | 0.0 | 37.3 | 69.3 | 38.8 | 0.5 |

*all amounts are expressed as parts by weight solids

To prepare each dispersion, a mixture of 7.3% solids was prepared from 21 parts by weight nitrocellulose polymer (RS ½ sec, Aqualon Co.), 38.9 parts by weight polyurethane polymer Oistane 5703 P, B. F. Goodrich), 4 parts by weight lecithin, and a 74/18/8 solvent blend of THF, MEK, and toluene. The mixture was thoroughly mixed in a high shear mixing chamber. Next, the carbon blacks were added with high shear mixing, increasing the solids content to 16%. After adding and mixing the carbon blacks, the mixture was milled for 30 minutes mill residence time in a horizontal sandmill using SEPR ceramic media. One day prior to coating, a 75% solids solution containing the premilled and predispersed alumina in THF (the solution also contained one part each of Emcol Phosphate and PPP per 100 parts $Al_2O_3$), the remaining nitrocellulose if any (added as 18% solids in a 3:1 THF/toluene blend), and the remaining polyurethane polymer if any (added as 15% solids in a 70:30 MEK/toluene blend) were added with high shear mixing. Just prior to coating, the fungicide and the crosslinking agent (added as 60% solids in PMA) were added with high shear mixing along with enough THF to thin the dispersion to 14% solids. The dispersion was then filtered, gravure coated onto a PET film substrate, and dried. A magnetic coating (prepared in accordance with Sample 15A) was coated onto the other side of the substrate. The resulting magnetic recording tape was slit and loaded into a cartridge or cassette.

EXAMPLE 19

A magnetic recording tape was prepared in accordance with Example 17 except (1) 32.5 parts by weight nitrocellulose, 48.8 parts by weight polyurethane, and 27.9 pasts by weight crosslinking agent; (2) the initial solvent blend was 73/19/8 THF, MEK, and toluene; (3) the predispersed and premilled alumina was added along with the carbon blacks; (4) at the time of milling, the solids content was 20%; and (5) the mill residence time was 18 minutes.

EXAMPLE 20

A mixture of about 9% solids was prepared from 33.2 parts by weight of nitrocellulose polymer (RS ½ sec, Aqualon Co.), 49.7 parts by weight polyurethane polymer (Estane 5703 P, B. F. Goodrich Co.), 4 parts by weight lecithin (Cetrolux-P, Central Soyu Co.), and a 79/15/6 solvent blend of THF, MEK, and toluene. The mixture was thoroughly mixed in a high shear mixing chamber. Next, 80 parts 100% compressed acetylene carbon black (Chevron Chemical Co.) and 20 parts Thermax N-991 carbon black (Cancarb, Ltd.) were added with mixing, increasing the percent solids to 14%. After adding and mixing the carbon black, the mixture was milled for 20 minutes mill residence time in a horizontal sandmill containing SEPR ceramic media. Next, a 75% solids solution containing 33.8 parts by weight predispersed and premilled $Al_2O_3$ in THF (the solution also contained one part Emcol Phosphate and one part PPP per 100 parts $Al_2O_3$) was added to the milled dispersion with high shear mixing. Additional THF was then added with high shear mixing to thin the dispersion to about 14% solids.

Just prior to coating, a solution containing 28.4 parts by weight of a polyisocyanate crosslinking agent (prepared in accordance with Example 1), 0.5 parts by weight fungitide (Amical-48), 2 parts by weight hexadecyl-dimethylamine catalyst (ADMA-6, Ethyl Corp.), and enough THF to lower the solids content to 14% were added to the dispersion with high shear mixing. The dispersion was then filtered, gravure coated onto a PET film substrate, and dried. A magnetic coating (prepared in accordance with Sample 15A of Example 15) was coated onto the other side of the substrate. Both coatings were then calendered. The resultant magnetic recording tape was then slit into an appropriate width and loaded into a cartridge or a cassette.

EXAMPLE 21

The coefficient of friction (at 120 inches/see) and air bleed times of the backside coatings for the magnetic tapes prepared in Examples 16–20 were measured at 0 passes and again after 5000 passes. As known in the art, air bleed time can be used to measure the surface roughness of a coating. See, e.g., U.S. Pat. No. 4,698,701; JP62-117138(A); and JPg3-000096(B). Generally a lower air bleed time corresponds to a rougher coating. The results were as follows:

| Sample No. | Coefficient of friction (0 passes) | Coefficient of friction (5000 passes) | Air bleed time (0 Passes) (seconds) | Air bleed time (5000 passes) (seconds) |
| --- | --- | --- | --- | --- |
| 16 | 0.143 | 0.184 | 300 | 573 |
| 17 | 0.163 | 0.165 | 335 | 632 |
| 18A | 0.191 | 0.228 | 273 | 501 |
| 18B | 0.145 | 0.242 | 302 | 566 |
| 18C | 0.141 | 0.211 | 353 | 546 |
| 18D | 0.148 | 0.191 | 410 | 651 |
| 18E | 0.177 | 0.209 | 315 | 535 |
| 18F | 0.164 | 0.242 | 387 | 665 |
| 18G | 0.157 | 0.215 | 311 | 582 |
| 18H | 0.157 | 0.253 | 375 | 639 |
| 18I | 0.122 | 0.158 | 404 | 627 |
| 18J | 0.163 | 0.205 | 333 | 528 |
| 18K | 0.188 | 0.202 | 295 | 527 |
| 18L | 0.189 | 0.255 | 313 | 510 |
| 18M | 0.154 | 0.219 | 317 | 531 |
| 18N | 0.167 | 0.226 | 348 | 664 |
| 18O | 0.161 | 0.237 | 287 | 485 |
| 18P | 0.186 | 0.255 | 343 | 557 |
| 18Q | 0.161 | 0.253 | 382 | 542 |
| 19 | 0.154 | 0.218 | 538 | 827 |
| 20 | 0.163 | 0.229 | 323 | 586 |

Other embodiments of this invention will be apparent to those skilled in the art upon consideration of this specification or from practice of the invention disclosed herein. Various omissions, modifications, and changes to the principles described herein may be made by one skilled in the art without departing from the true scope and spirit of the invention which is indicated by the following claims.

What is claimed is:

1. A magnetic recording medium, comprising a magnetic coating provided on a nonmagnetizable substrate, wherein the magnetic coating comprises a magnetic pigment dispersed in a polymeric binder, said binder being a matrix of cured components which comprise a film-forming, unhindered, aromatic polyisocyanate crosslinking agent and a polymer component, wherein:

(a) the polyisocyanate crosslinking agent comprises (i) a diisocyanate of the formula

OCN—A—NCO (ii) a first diisocyanate adduct of the formula

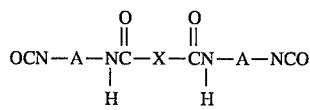

and (ii) a second diisocyanate adduct of the formula

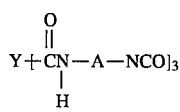

wherein:

each A moiety is independently a divalent, organic linking group having a chemical structure such that each NCO group pendant from each A moiety is aromatic and unhindered;

X is a divalent, organic linking group;

Y is a trivalent, organic linking group;

the crosslinking agent comprises less than about 25 weight percent of the diisocyanate; and the weight ratio of the difunctional diisocyanate adduct to the trifunctional diisocyanate adduct is in the range from about 1:20 to 20:1; and (b) the polymer component comprises at least one polymer having pendant hydroxyl groups.

2. The magnetic recording medium of claim 1, wherein the crosslinking agent has an average NCO equivalent weight of less than about 500.

3. The magnetic recording medium of claim 1, wherein the crosslinking agent has an average NCO equivalent weight in the range from about 150 to about 500.

4. The magnetic recording medium of claim 1, wherein A is

5. The magnetic recording medium of claim 1, wherein A is

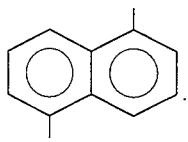

6. The magnetic recording medium of claim 1, wherein A is

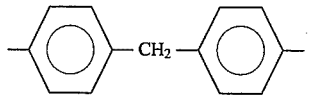

7. The magnetic recording medium of claim 1, wherein X has the formula

—OR¹O—, wherein $R^1$ is a divalent, organic linking group.

8. The magnetic recording medium of claim 7, wherein $R^1$ is selected from the group consisting of straight, branched or cyclic alkylene, arylene, aralkylene, polyalkylene oxide, polyalkylene sulfide, and polyester.

9. The magnetic recording medium of claim 7, wherein $R^1$ is

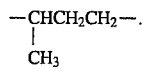

10. The magnetic recording medium of claim 7, wherein $R^1$ is

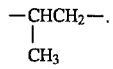

11. The magnetic recording medium of claim 7, wherein $R^1$ is

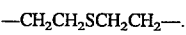
—CH₂CH₂SCH₂CH₂—.

12. The magnetic recording medium of claim 7, wherein $R^1$ is

—CH₂CH₂OCH₂CH₂—.

13. The magnetic recording medium of claim 7, wherein $R^1$ is

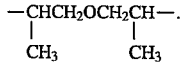

14. The magnetic recording medium of claim 7, wherein $R^1$ is

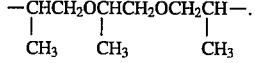

15. The magnetic recording medium of claim 1, wherein Y has the formula

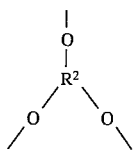

wherein $R^2$ is a trivalent, organic linking group.

16. The magnetic recording medium of claim 15, wherein $R^2$ is

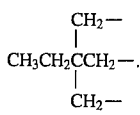

17. The magnetic recording medium of claim 15, wherein $R^2$ is

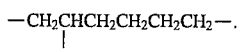

18. The magnetic recording medium of claim 15, wherein $R^2$ is

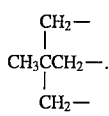

19. The magnetic recording medium of claim 15, wherein $R^2$ is

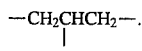

20. The magnetic recording medium of claim 1, wherein the crosslinking agent has an NCO equivalent weight in the range from about 150 to about 500.

21. A magnetic recording medium comprising a nonmagnetizable substrate having first and second opposed major surfaces, a magnetic coating provided on the first major surface of the substrate, and a backside coating provided on the second major surface of the substrate, wherein the backside coating comprises a polymeric binder, said polymeric binder being a matrix of cured components which comprise a film-forming, unhindered, aromatic polyisocyanate crosslinking agent and a polymer component wherein the polymer component comprises at least one polymer with pendant hydroxyl groups, and wherein the polyisocyanate crosslinking agent comprises (a) a diisocyanate of the formula

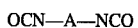

(b) a first diisocyanate adduct of the formula

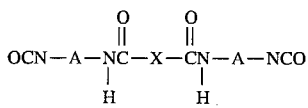

and
second diisocyanate adduct of the formula

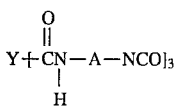

wherein:
each A moiety is independently a divalent, organic linking group having a chemical structure such that each NCO group pendant from each A moiety is aromatic and unhindered;
X is a divalent, organic linking group;
Y is a trivalent, organic linking group;
the crosslinking agent comprises less than about 25 weight percent of the diisocyanate; and
the weight ratio of the difunctional diisocyanate adduct to the trifunctional diisocyanate adduct is in the range from about 1:20 to 20:1.

22. The magnetic recording medium of claim 21, wherein the crosslinking agent has an NCO equivalent weight of less than about 500.

23. The magnetic recording medium of claim 21, wherein the crosslinking agent has an NCO equivalent weight in the range from about 150 to about 500.

24. The magnetic recording medium of claim 21, wherein the diisocyanate has a melting point of greater than about 25° C.

25. The magnetic recording medium of claim 21, wherein A is

26. The magnetic recording medium of claim 21, wherein A is

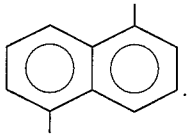

27. The magnetic recording medium of claim 21, wherein A is

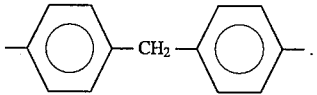

28. The magnetic recording medium of claim 21, wherein X has the formula

wherein $R^1$ is a divalent, organic linking group.

29. The magnetic recording medium of claim 28, wherein $R^1$ is selected from the group consisting of straight, branched or cyclic alkylene, arylene, aralkylene, polyalkylene oxide, and polyester.

30. The magnetic recording medium of claim 28, wherein $R^1$ is

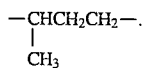

31. The magnetic recording medium of claim 28, wherein $R^1$ is

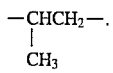

32. The magnetic recording medium of claim 28, wherein $R^1$ is

—CH₂CH₂SCH₂CH₂—.

33. The magnetic recording medium of claim 28, wherein $R^1$ is

—CH₂CH₂OCH₂CH₂—.

34. The magnetic recording medium of claim 28, wherein $R^1$ is

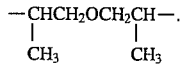

35. The magnetic recording medium of claim 28, wherein $R^1$ is

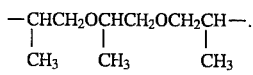

36. The magnetic recording medium of claim 21, wherein Y has the formula

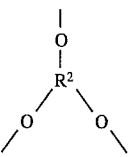

wherein $R^2$ is a trivalent, organic linking group.

37. The magnetic recording medium of claim 36, wherein $R^2$ is

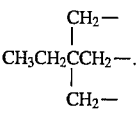

38. The magnetic recording medium of claim 36, wherein $R^2$ is

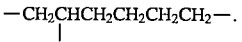

39. The magnetic recording medium of claim 36, wherein $R^2$ is

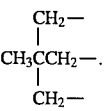

40. The magnetic recording medium of claim 36, wherein $R^2$ is

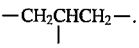

41. The magnetic recording medium of claim 21, wherein the crosslinking agent has an average NCO equivalent weight in the range from about 150 to about 500.

* * * * *

UNITED STATES PATENT AND TRADEMARK OFFICE
CERTIFICATE OF CORRECTION

PATENT NO.: 5,595,824

DATED: January 21, 1997

INVENTOR(S): Rustad

It is certified that error appears in the above-identified patent and that said Letters Patent is hereby corrected as shown below:

Col. 3, line 29, "magnetic:" should be --magnetic--.

Col. 6, line 61, "matings" should be --coatings--.

Col. 7, line 37, "carded" should be --carried--.

Col. 12, line 56, "beating" should be --bearing--.

Col. 18, lines 63/64, "80°14 90°C" should be --80°-90°C--.

Col. 19, line 25, "4055" should be --40%--.

Col. 26, line 67, "Oistane" should be --(Estane--.

Col. 27, line 27, "pasts" should be --parts--.

Col. 28, line 16, "fungitide" should be --fungicide--.

Signed and Sealed this

Fourteenth Day of October, 1997

*Attest:*

BRUCE LEHMAN

*Attesting Officer*     *Commissioner of Patents and Trademarks*